United States Patent
Yasuoka et al.

(10) Patent No.: US 8,599,585 B2
(45) Date of Patent: Dec. 3, 2013

(54) POWER CONVERSION DEVICE

(75) Inventors: Ikuo Yasuoka, Tokyo (JP); Shinichi Toda, Tokyo (JP); Mitsuhiro Numazaki, Tokyo (JP); Yosuke Nakazawa, Tokyo (JP); Makoto Takeda, Tokyo (JP); Takahiko Minami, Tokyo (JP); Takashi Takagi, Tokyo (JP)

(73) Assignee: Toshiba Corporation, Tokyo (JP)

( * ) Notice: Subject to any disclaimer, the term of this patent is extended or adjusted under 35 U.S.C. 154(b) by 267 days.

(21) Appl. No.: 13/048,671

(22) Filed: Mar. 15, 2011

(65) Prior Publication Data

US 2011/0310643 A1 Dec. 22, 2011

(30) Foreign Application Priority Data

Jun. 22, 2010 (JP) ................................. 2010-141709

(51) Int. Cl.
*H02M 5/45* (2006.01)
(52) U.S. Cl.
USPC ......... 363/37; 363/40; 363/56.03; 363/56.04; 363/132
(58) Field of Classification Search
USPC ........... 363/37, 40, 41, 56.01, 56.02, 95, 131, 363/132, 56.03, 56.04
See application file for complete search history.

(56) References Cited

U.S. PATENT DOCUMENTS

| 5,801,936 A | * | 9/1998 | Mori et al. ..................... 363/132 |
| 8,310,848 B2 | * | 11/2012 | Sakakibara ..................... 363/37 |
| 2008/0258184 A1 | * | 10/2008 | Sankin et al. .................. 257/265 |

FOREIGN PATENT DOCUMENTS

| JP | H6276675 | 9/1994 |
| JP | 2007-252055 | 9/2007 |
| JP | 2007-305836 | 11/2007 |
| JP | 2008-017237 | 1/2008 |
| JP | 2009-159184 | 7/2009 |
| WO | 2007-101745 | 9/2007 |

OTHER PUBLICATIONS

Korean Intellectual Property Office Notice of Preliminary Rejection for Application No. 10-2011-60283 Mailed Sep. 17, 2012.

* cited by examiner

*Primary Examiner* — Nguyen Tran
(74) *Attorney, Agent, or Firm* — Baker Botts L.L.P.

(57) ABSTRACT

According to one embodiment, an electronic device includes a positive electrode, a negative electrode, a first terminal, a second terminal, a first plurality of switching elements and anti-parallel diodes coupled between the positive electrode and the first terminal and the second terminal, a second plurality of switching elements and anti-parallel diodes coupled between the negative electrode and the first terminal and the second terminal and a PiN diode coupled between the positive electrode and the negative electrode with reverse polarity.

12 Claims, 10 Drawing Sheets

POWER CONVERSION DEVICE

CROSS-REFERENCE TO RELATED APPLICATIONS

This application is based upon and claims the benefit of priority from Japanese Patent Application No. 2010141709, filed on Jun. 22, 2010, the entire contents of which are incorporated herein by reference.

FIELD

Embodiments described herein generally relate to electronic devices.

BACKGROUND

In recent years, research and development of a power semiconductor element using SiC is accomplished. SiC is superior in semiconductor properties than conventional Si. Particularly, SiC shows high dielectric breakdown strength, and use of SiC makes it possible to implement a higher-voltage-resistance element as compared with Si. Although only a low voltage resistance of about several hundred volts can be realized with SBD (Schottky Barrier Diode) or JBS (Junction Barrier Schottky) diodes using Si, a high voltage resistance of 1700 volts or more is realized through the use of SiC.

In the case where SBD or JBS diodes are applied to freewheel diodes of a power conversion circuit, reverse recovery does not occur at the time of turnoff and diode recovery loss becomes substantially negligible, since, unlike the conventional PiN diodes, the SBD or JBS diodes are not bipolar devices. Therefore, reduction in loss contributes to enhancing the device efficiency and reducing the device size. Freewheel diodes, also known as flyback diodes, are diodes used to reduce flyback, voltage spikes that are seen across inductive loads when a supply voltage is suddenly reduced or removed.

If a circuit is shorted between positive and negative electrodes due to element failure or a control error in a power conversion device with a two-level or three-level circuit, the electric charges in a capacitor provided between the positive and negative electrodes abruptly flow through the short circuit. After the capacitor has been discharged, the voltage and the current become oscillatory due to the relationship between the capacity of the capacitor and the inductance of the main circuit, thereby generating a reverse current (a current flowing from a negative electrode to a positive electrode) in some cases. Although the element may not be destroyed by the current right after the short-circuiting, there is a possibility that element destruction may occur and get worse because a reverse current far greater than a rated value will be then shunted to the freewheel diodes.

While the SBD or JBS diodes are capable of contributing to loss reduction, they have a drawback in that the surge current resistance thereof is smaller than that of the PiN diode. For that reason, it is believed the SBD or JBS diodes tend to be more easily destroyed than the PiN diode by an electric current that is far greater than the rated value, e.g., the reverse current flowing after the circuit is shorted between the positive and negative electrodes. Thus, there is a concern that this may possibly reduce device reliability. In the case of a power conversion device used in subways, a high voltage such as 3300 V, 4500V or 6500V is supplied, and bigger problems may occur.

DETAILED DESCRIPTION

A power conversion device according to one embodiment comprises a positive electrode, a negative electrode, freewheel diodes formed of SBD or JBS diodes; and a PiN diode connected with a pair of arms connected in anti-parallel between the positive electrode and the negative electrode at the DC side of the power conversion device, whereby element destruction is suppressed when a circuit is shorted between the positive electrode and the negative electrode.

Certain embodiments will now be described in detail with reference to the accompanying drawings.

First Embodiment

Figure 1:
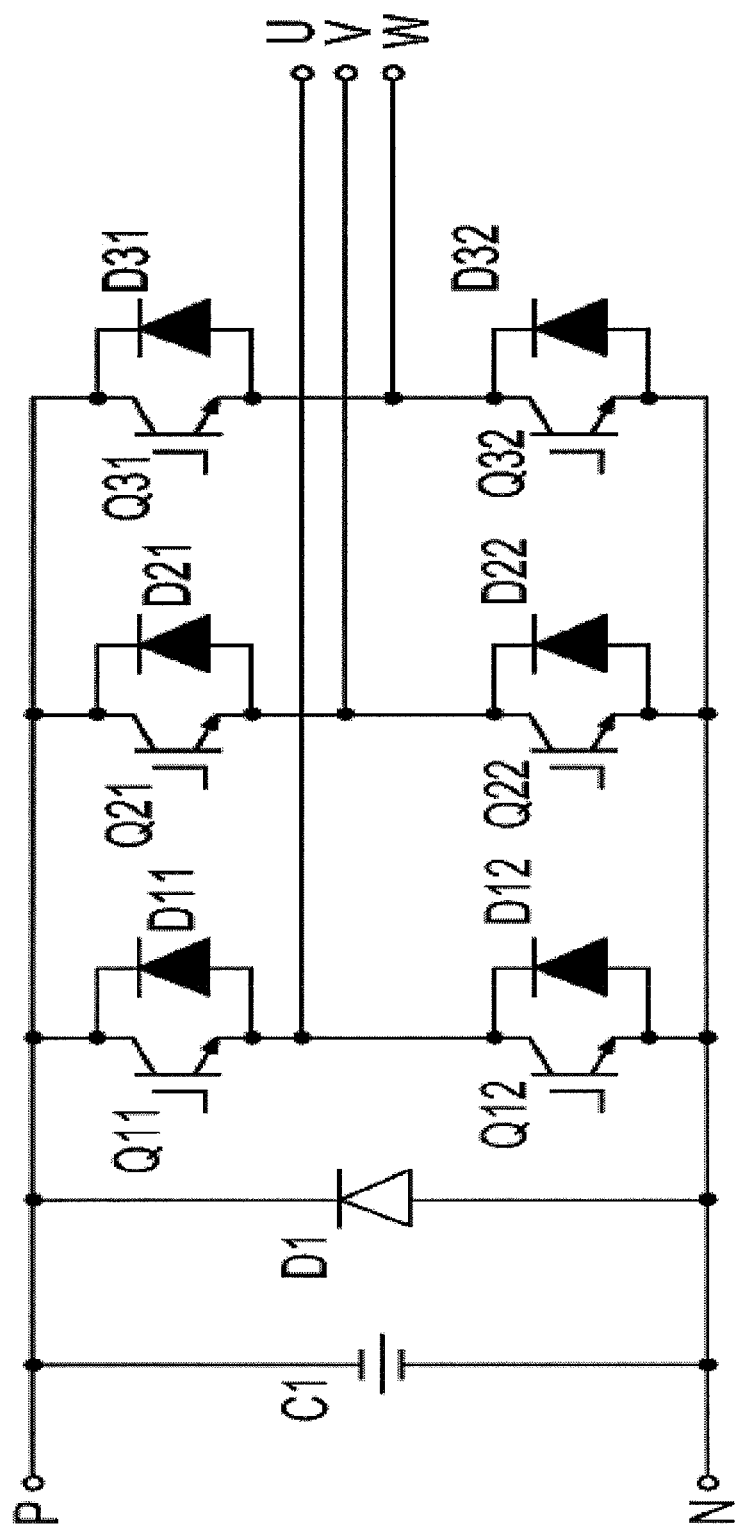
FIG. 1 is a circuit diagram showing a power conversion device of a first embodiment.

FIG. 1 shows a power conversion device of a first embodiment. The present embodiment is directed to a power conversion device formed of a two-level, three-phase circuit. The upper and lower arms of bridges for respective U, V and W phases of a power conversion circuit consist of semiconductor switching elements Q11 through Q32 such as IGBT elements, and SBD or JBS freewheel diodes D11 through D32 made of SiC with a pair of arms connected in anti-parallel to the respective semiconductor switching elements Q11 through Q32. A capacitor C1 is connected between a positive electrode P and a negative electrode N at the DC side of the power conversion circuit, and at the same time, a PiN diode D1 is connected with a pair of arms connected in anti-parallel between the positive electrode P and the negative electrode N at the AC side of the capacitor C1.

Figure 9:
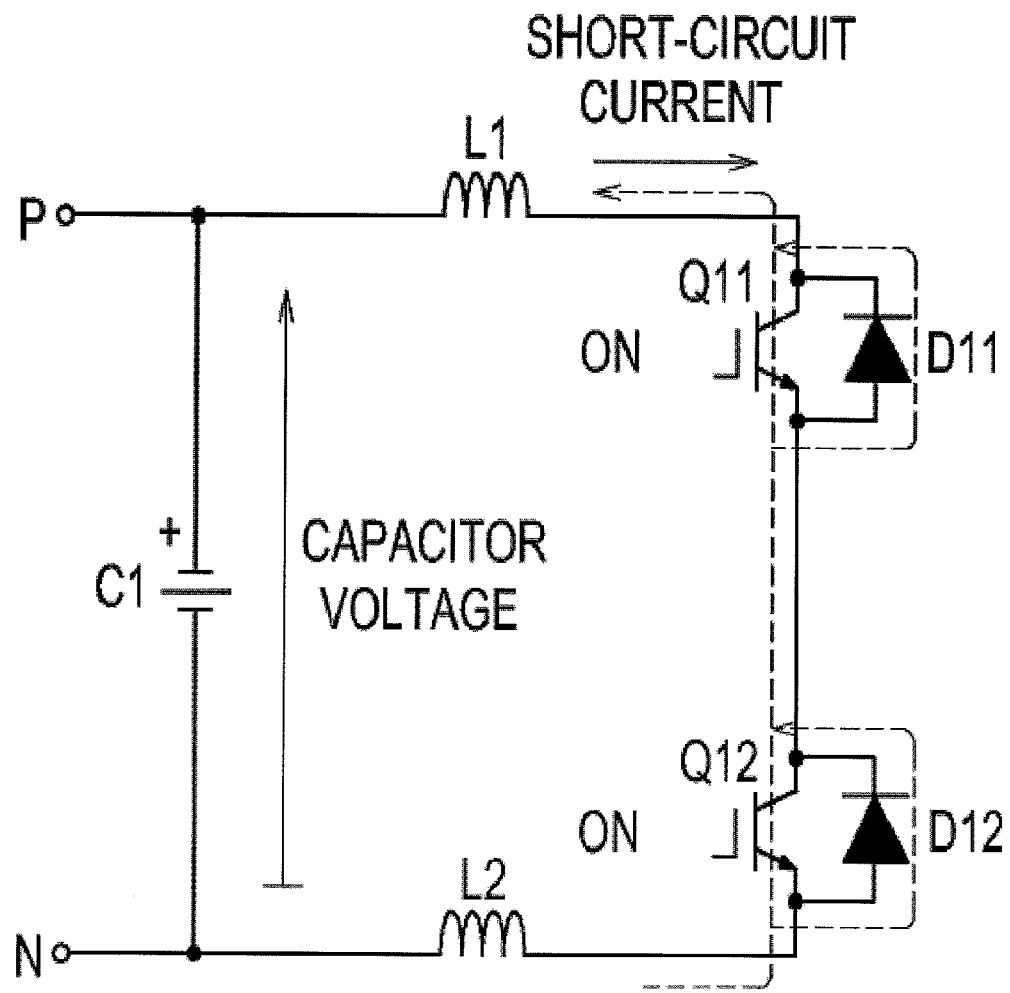
FIG. 9 is a circuit diagram showing a short-circuit simulation for the power conversion device of the eighth embodiment.

The power conversion device of the present embodiment operates as follows. Typically, in a power conversion device formed of a two-level, three-phase circuit, if the upper semiconductor switching element Q11 and the lower semiconductor switching element Q12 come into a conduction state at the same time as illustrated in FIG. 9 and thus, the circuit is shorted between the positive electrode P and the negative electrode N, the voltage and the current becomes oscillatory due to the main circuit inductances L1 and L2 and the capacitor C1, thus generating a reverse current flowing from the negative electrode N toward the positive electrode P as indicated by a dot line. When the reverse current is shunted to the freewheel diodes D11 and D12 of a normal element, the possibility of element destruction becomes higher compared to the power conversion device employing PiN diodes as the freewheel diodes D11 and D12 since the SBD and the JBS have a surge current resistance lower than that of the PiN diode.

Figure 10:
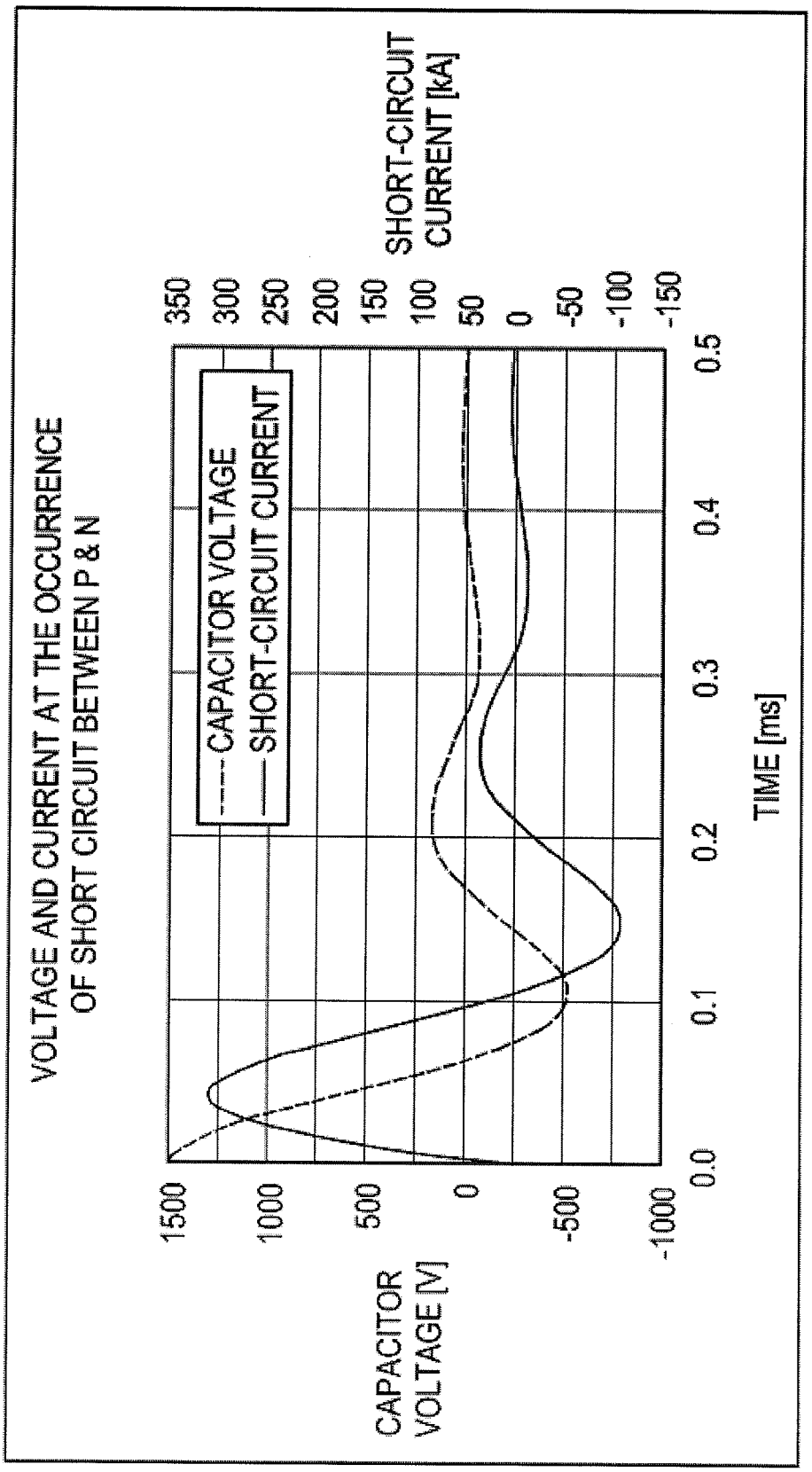
FIG. 10 is a current-voltage waveform diagram by the short-circuit simulation.

In the power conversion device of the present embodiment, therefore, the PiN diode D1 is connected with a pair of arms connected in anti-parallel between the positive electrode P and the negative electrode N at the AC side of the capacitor C1. Consequently, if the circuit is shorted between the positive electrode P and the negative electrode N and thus a reverse current flows, the reverse current is shunted to the PiN diode D1 as well as the freewheel diodes D11 through D32. In this case, the internal impedance of the SiC-made SBD diode is higher than that of the PiN diode. For example, in the graph illustrated in FIG. 10, since the impedance of the SBD diode becomes one hundred times or more of a rated current for a surge current of 100 kA, the surge current is hardly shunted to the SBD diode but is shunted to the PiN diode. According to the present embodiment, therefore, it becomes possible to shunt most of the surge current to the PiN diode, eventually reducing the current flowing through the SBD and JBS diodes of freewheeling diodes D11 through D32. This makes it possible to suppress destruction of the SBD or JBS freewheel diodes and to suppress occurrence and expansion of destruction of the IGBT module.

Second Embodiment

Figure 2:
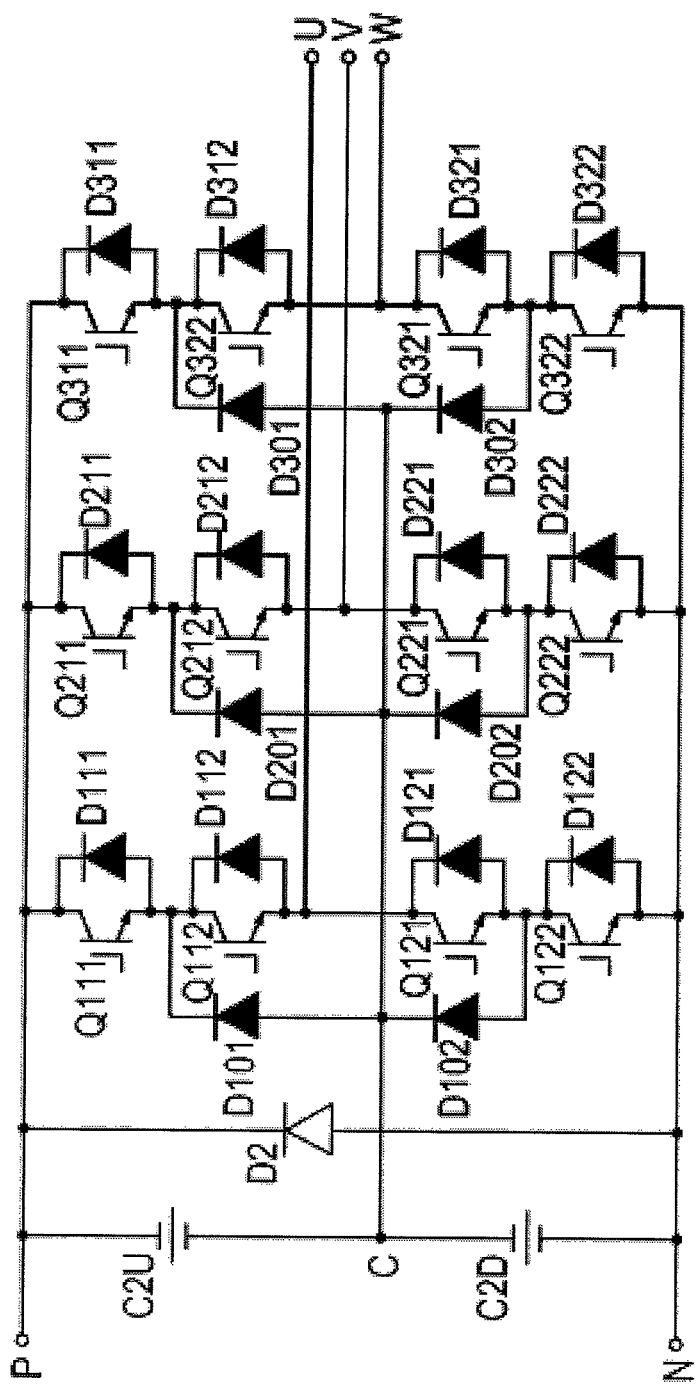
FIG. 2 is a circuit diagram showing a power conversion device of a second embodiment.

FIG. 2 shows a power conversion device of a second embodiment. The present embodiment is directed to a power conversion device formed of a three-level, three-phase circuit. The upper and lower arms of bridges for respective U, V and W-phases of a power conversion circuit consist of semiconductor switching elements Q111 through Q322 such as IGBT elements, SBD or JBS freewheel diodes D111 through D322 made of SiC with a pair of arms connected in anti-parallel to the respective semiconductor switching elements Q111 through Q322, and SBD or JBS freewheel diodes D101 through D302 made of SiC respectively connected between the center point C and the element connection point of the upper arm and between the center point C and the element connection point of the lower arm. Capacitors C2U and C2D are respectively connected between the positive electrode P and the center point C and between the center point C and the negative electrode N, and at the same time, a PiN diode D2 is connected with a pair of arms connected in anti-parallel between the positive electrode P and the negative electrode N at the AC side of the capacitors C2U and C2D.

If the circuit is shorted between the positive electrode P and the negative electrode N in the power conversion device formed of a three-level, three-phase circuit, the voltage and the current becomes oscillatory due to the main circuit inductances and the capacitors C2U and C2D, thus generating a reverse current flowing from the negative electrode N toward the positive electrode P. In the power conversion device of the present embodiment, however, the PiN diode D2 is connected with a pair of arms connected in anti-parallel between the positive electrode P and the negative electrode N at the AC side of the capacitors C2U and C2D. Consequently, if the circuit is shorted between the positive electrode P and the negative electrode N and thus a reverse current flows, it is possible to shunt the reverse current to the PiN diode D2 as well as the freewheel diodes D111 through D322 and D101 through D302, eventually reducing the current flowing through the SBD and JBS diodes of the freewheel diodes D111 through D322 and D101 through D302. This makes it possible to suppress destruction of the SBD or JBS freewheel diodes and to suppress the occurrence and expansion of destruction of the IGBT module.

Third Embodiment

Figure 3:
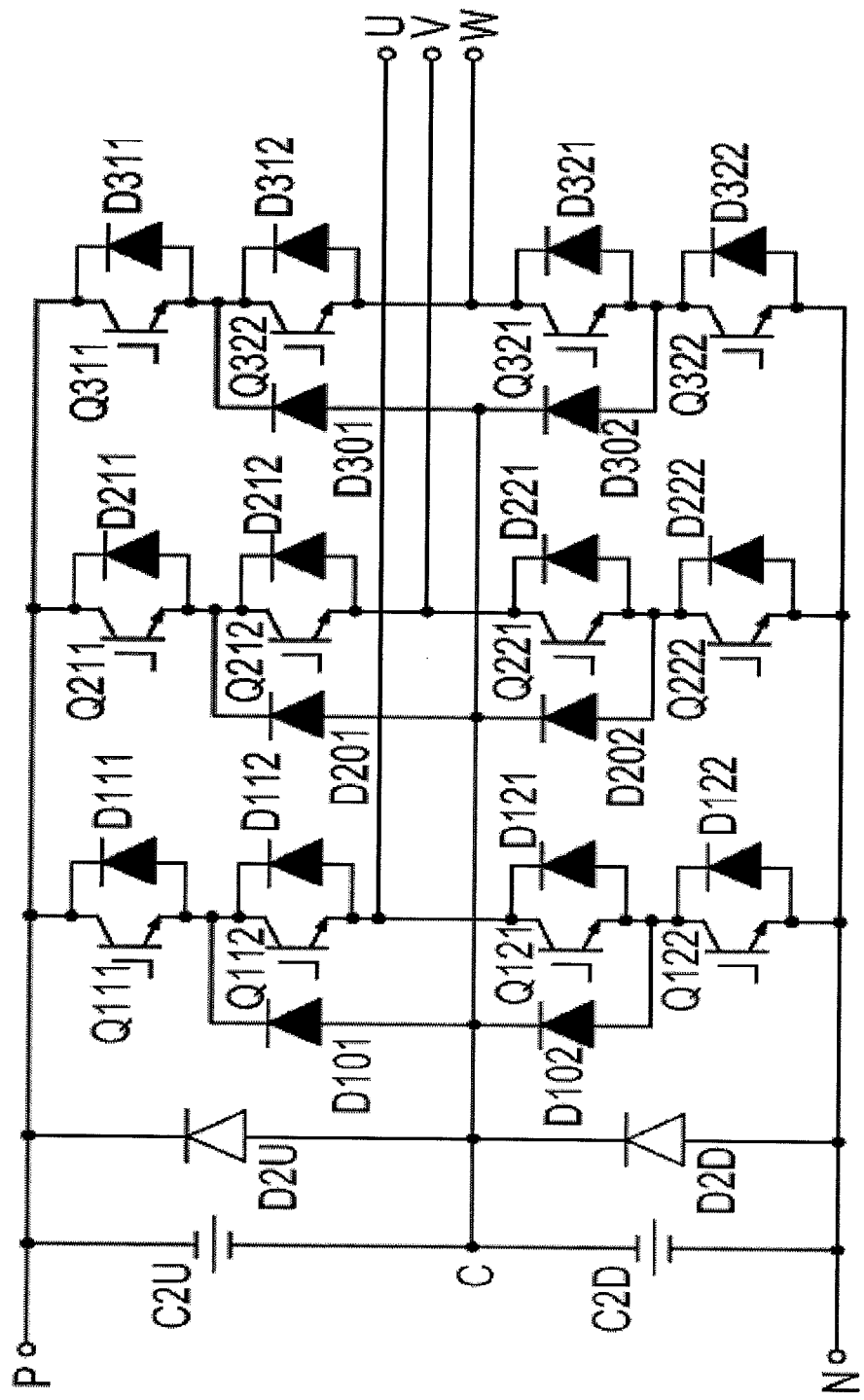
FIG. 3 is a circuit diagram showing a power conversion device of a third embodiment.

FIG. 3 shows a power conversion device of a third embodiment. The present embodiment is directed to a power conversion device formed of a three-level, three-phase circuit. The upper and lower arms of bridges for respective U, V and W-phases of a power conversion circuit include semiconductor switching elements Q111 through Q322 such as IGBT elements, SBD or JBS freewheel diodes D111 through D322 made of SiC with a pair of arms connected in anti-parallel to the respective semiconductor switching elements Q111 through Q322, and SBD or JBS freewheel diodes D101 through D302 made of SiC respectively connected between the center point C and the element connection point of the upper arm and between the center point C and the element connection point of the lower arm. Capacitors C2U and C2D are respectively connected between the positive electrode P and the center point C and between the center point C and the negative electrode N, and at the same time PiN diodes D2U and D2D are connected with a pair of arms connected in anti-parallel between the positive electrode P and the center point C and between the center point C and the negative electrode N at the AC side of the capacitors C2U and C2D.

If the circuit is shorted between the positive electrode P and the negative electrode N in the power conversion device formed of a three-level, three-phase circuit, the voltage and the current becomes oscillatory due to the main circuit inductances and the capacitors C2U and C2D, thus generating a reverse current flowing from the negative electrode N toward the positive electrode P. In the power conversion device of the present embodiment, however, the PiN diodes D2U and D2D are connected with a pair of arms connected in anti-parallel between the positive electrode P and the center point C and between the center point C and the negative electrode N at the AC side of the capacitors C2U and C2D. Consequently, if the circuit is shorted between the positive electrode P and the negative electrode N and thus a reverse current flows, it is possible to shunt the reverse current to the PiN diodes D2U and D2D as well as the freewheel diodes D111 through D322 and D101 through D302, eventually reducing the current flowing through the SBD and JBS diodes of the freewheel diodes D111 through D322 and D101 through D302. This makes it possible to suppress destruction of the SBD or JBS freewheel diodes and to suppress the occurrence and expansion of destruction of the IGBT module.

Moreover, in the power conversion device formed of a three-level, three-phase circuit, the circuit is shorted between the positive electrode P and the center point C or between the center point C and the negative electrode N as well as between the positive electrode P and the negative electrode N. In this case, the voltage and the current becomes oscillatory due to the main circuit inductances and the capacitor C2U or C2D, thus generating a reverse current flowing from the center point C toward the positive electrode P or from the negative electrode N toward the center point C. In the present embodiment, however, the PiN diodes D2U and D2D are connected with a pair of arms connected in anti-parallel between the positive electrode P and the center point C and between the center point C and the negative electrode N at the AC side of the capacitors C2U and C2D. Consequently, it is possible to reduce the shunting percentage of the SBD and JBS diodes used as the freewheel diodes and to suppress element destruction by shunting the reverse current even to the PiN diodes D2U and D2D.

Fourth Embodiment

Figure 4:
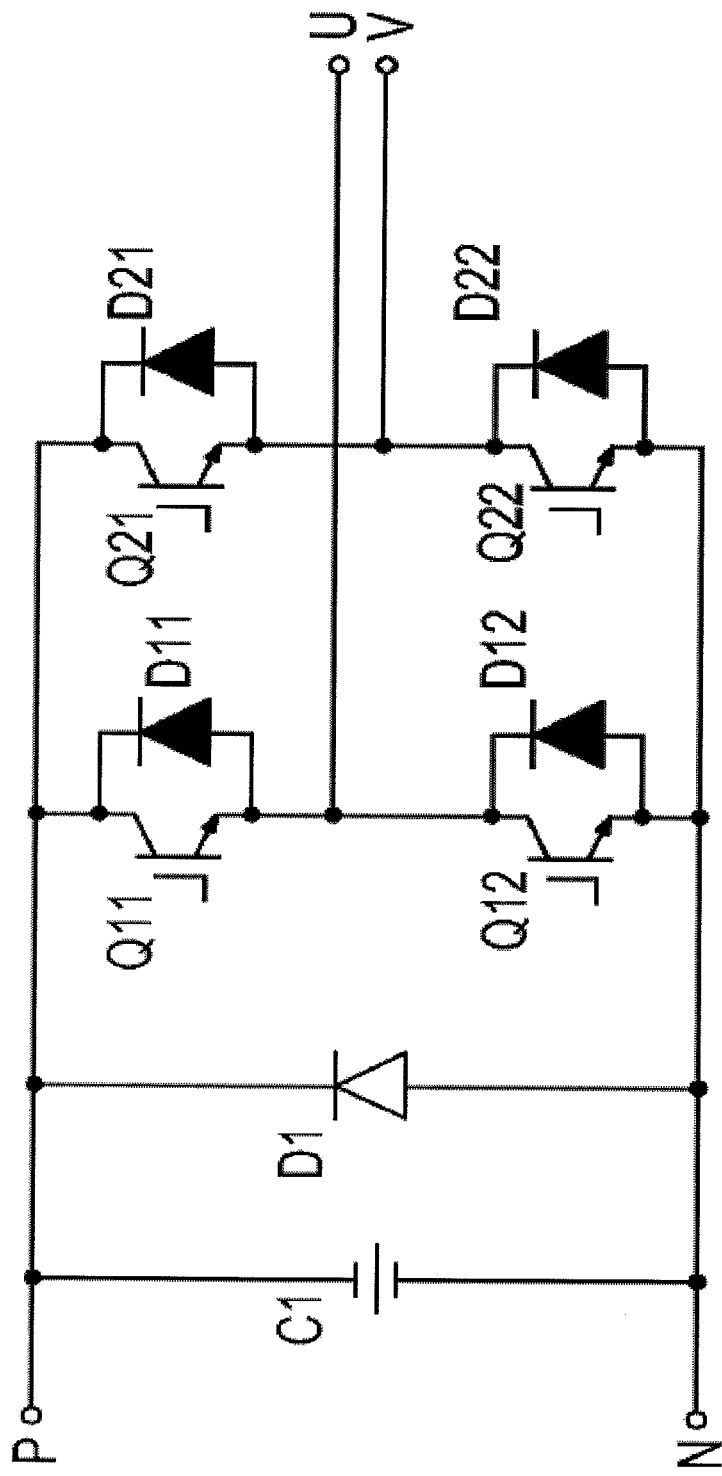
FIG. 4 is a circuit diagram showing a power conversion device of a fourth embodiment.

FIG. 4 shows a power conversion device of a fourth embodiment. The present embodiment is directed to a power conversion device formed of a two-level, single-phase circuit. The upper and lower arms of bridges for respective U and V-phases of a power conversion circuit include semiconductor switching elements Q11 through Q22 such as IGBT elements, and SBD or JBS freewheel diodes D11 through D22 made of SiC with a pair of arms connected in anti-parallel to the respective semiconductor switching elements Q11 through Q22. A capacitor C1 is connected between a positive electrode P and a negative electrode N at the DC side of the power conversion circuit, while a PiN diode D1 is connected with a pair of arms connected in anti-parallel between the positive electrode P and the negative electrode N at the AC side of the capacitor C1.

In the power conversion device of the present embodiment, the PiN diode D1 is connected with a pair of arms connected in anti-parallel between the positive electrode P and the negative electrode N at the AC side of the capacitor C1. Consequently, if the circuit is shorted between the positive electrode P and the negative electrode N and thus a reverse current flows, it is possible to shunt the reverse current to the PiN diode D1 as well as the freewheel diodes D11 through D22, eventually reducing the current flowing through the SBD and JBS diodes of the freewheel diodes D11 through D22. This makes it possible to suppress destruction of the SBD or JBS freewheel diodes and to suppress the occurrence and expansion of destruction of the IGBT module.

Fifth Embodiment

Figure 5:
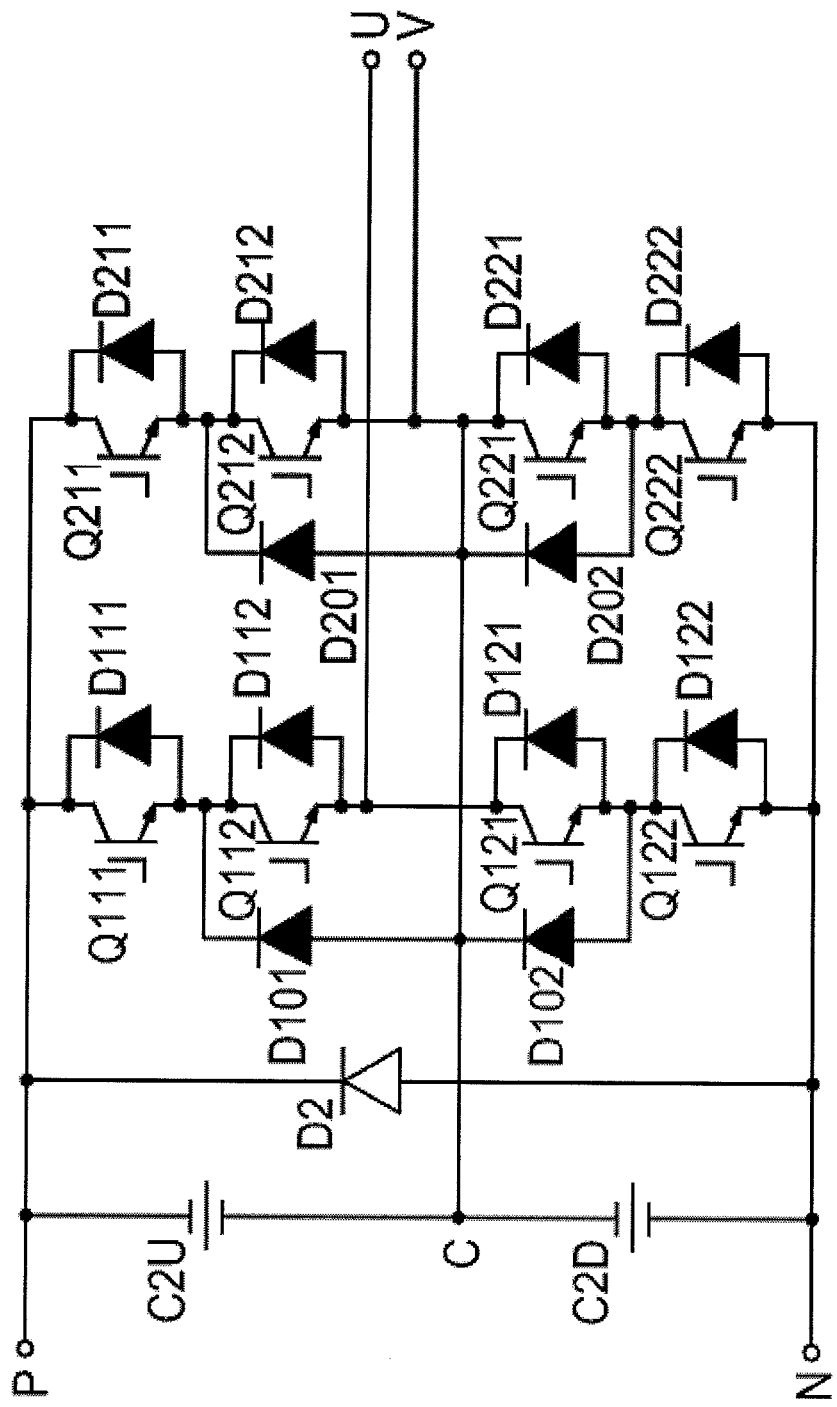
FIG. 5 is a circuit diagram showing a power conversion device of a fifth embodiment.

FIG. 5 shows a power conversion device of a fifth embodiment. The present embodiment is directed to a power conversion device formed of a three-level, single-phase circuit. The upper and lower arms of bridges for respective U and V-phases of a power conversion circuit consist of semiconductor switching elements Q111 through Q222 such as IGBT elements, SBD or JBS freewheel diodes D111 through D222 made of SiC with a pair of arms connected in anti-parallel to the respective semiconductor switching elements Q111 through Q222, and SBD or JBS freewheel diodes D101 through D202 made of SiC respectively connected between the center point C and the element connection point of the upper arm and between the center point C and the element connection point of the lower arm. Capacitors C2U and C2D are respectively connected between the positive electrode P and the center point C and between the center point C and the negative electrode N, and at the same time a PiN diode D2 is connected with a pair of arms connected in anti-parallel between the positive electrode P and the negative electrode N at the AC side of the capacitors C2U and C2D.

If the circuit is shorted between the positive electrode P and the negative electrode N in the power conversion device formed of a three-level, single-phase circuit, the voltage and the current becomes oscillatory by the main circuit inductances and the capacitors C2U and C2D, thus generating a reverse current flowing from the negative electrode N toward the positive electrode P. In the power conversion device of the present embodiment, however, the PiN diode D2 is connected with a pair of arms connected in anti-parallel between the positive electrode P and the negative electrode N at the AC side of the capacitors C2U and C2D. Consequently, if the circuit is shorted between the positive electrode P and the negative electrode N and thus a reverse current flows, it is possible to shunt the reverse current to the PiN diode D2 as well as the freewheel diodes D111 through D222 and D101 through D202, eventually reducing the current flowing through the SBD and JBS diodes used as the freewheel diodes D111 through D222 and D101 through D202. This makes it possible to suppress destruction of the SBD or JBS freewheel diodes and to suppress the occurrence and expansion of destruction of the IGBT module.

Sixth Embodiment

Figure 6:
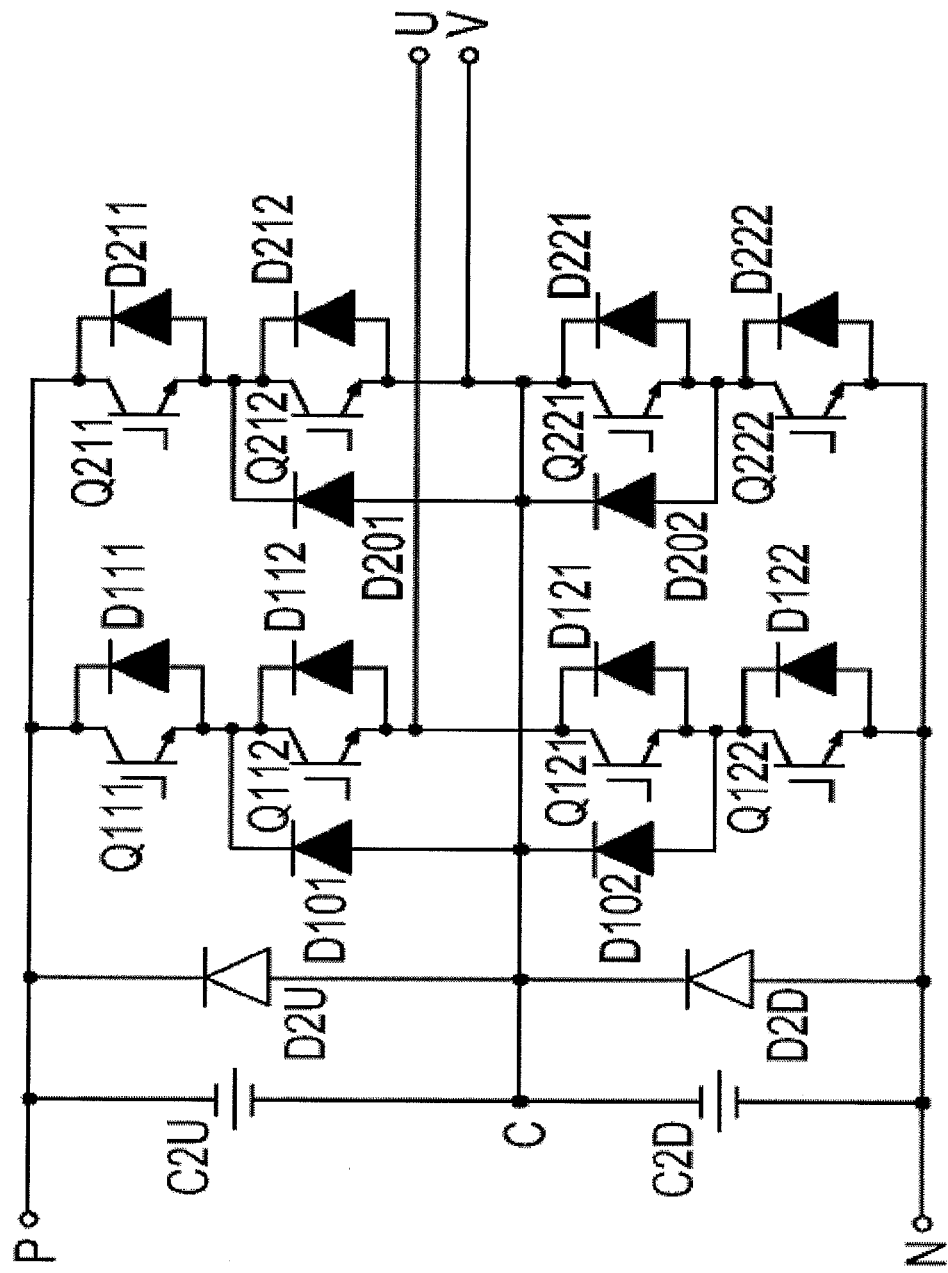
FIG. 6 is a circuit diagram showing a power conversion device of a sixth embodiment.

FIG. 6 shows a power conversion device of a sixth embodiment. The present embodiment is directed to a power conversion device formed of a three-level, single-phase circuit. The upper and lower arms of U and V-phases bridges of a power conversion circuit include semiconductor switching elements Q111 through Q222 formed of, e.g., IGBT elements or the like, SBD or JBS freewheel diodes D111 through D222 made of SiC with a pair of arms connected in anti-parallel to the respective semiconductor switching elements Q111 through Q222, and SBD or JBS freewheel diodes D101 through D202 made of SiC respectively connected between the center point C and the element connection point of the upper arm and between the center point C and the element connection point of the lower arm. Capacitors C2U and C2D are respectively connected between the positive electrode P and the center point C and between the center point C and the negative electrode N, and at the same time PiN diodes D2U and D2D are respectively connected with a pair arms connected in anti-parallel between the positive electrode P and the center point C and between the center point C and the negative electrode N at the AC side of the capacitors C2U and C2D.

If the circuit is shorted between the positive electrode P and the negative electrode N in the power conversion device formed of a three-level, single-phase circuit, the voltage and the current becomes oscillatory due to the main circuit inductances and the capacitors C2U and C2D, thus generating a reverse current flowing from the negative electrode N toward the positive electrode P. In the power conversion device of the present embodiment, however, the PiN diodes D2U and D2D are connected with a pair of arms connected in anti-parallel between the positive electrode P and the center point C and between the center point C and the negative electrode N at the AC side of the capacitors C2U and C2D. Consequently, if the circuit is shorted between the positive electrode P and the negative electrode N and thus a reverse current flows, it is possible to shunt the reverse current to the PiN diodes D2U and D2D as well as the freewheel diodes D111 through D222 and D101 through D202, eventually reducing the current flowing through the SBD and JBS diodes of the freewheel diodes D111 through D222 and D101 through D202. This makes it possible to suppress destruction of the SBD or JBS freewheel diodes and to suppress the occurrence and expansion of destruction of the IGBT module.

In the power conversion device formed of a three-level, single-phase circuit, the circuit is shorted between the positive electrode P and the center point C or between the center point C and the negative electrode N as well as between the positive electrode P and the negative electrode N. In this case, the voltage and the current becomes oscillatory by the main circuit inductances and the capacitor C2U or C2D, thus generating a reverse current flowing from the center point C toward the positive electrode P or from the negative electrode N toward the center point C. In the present embodiment, however, the PiN diodes D2U and D2D are connected between the positive electrode P and the center point C and between the center point C and the negative electrode N at the AC side of the capacitors C2U and C2D. Consequently, it is possible to reduce the shunting percentage of the SBD and JBS diodes used as the freewheel diodes and to suppress the element destruction by shunting the reverse current even to the PiN diodes D2U and D2D.

Seventh Embodiment

In the first and fourth embodiments, the capacitor C1 and the PiN diode D1 are connected in parallel between the positive electrode P and the negative electrode N. In the third and sixth embodiments, the capacitor C2U and the PiN diode D2U are connected in parallel between the positive electrode P and the center point C, and the capacitor C2D and the PiN diode D2D are connected in parallel between the center point C and the negative electrode N.

Figure 7:
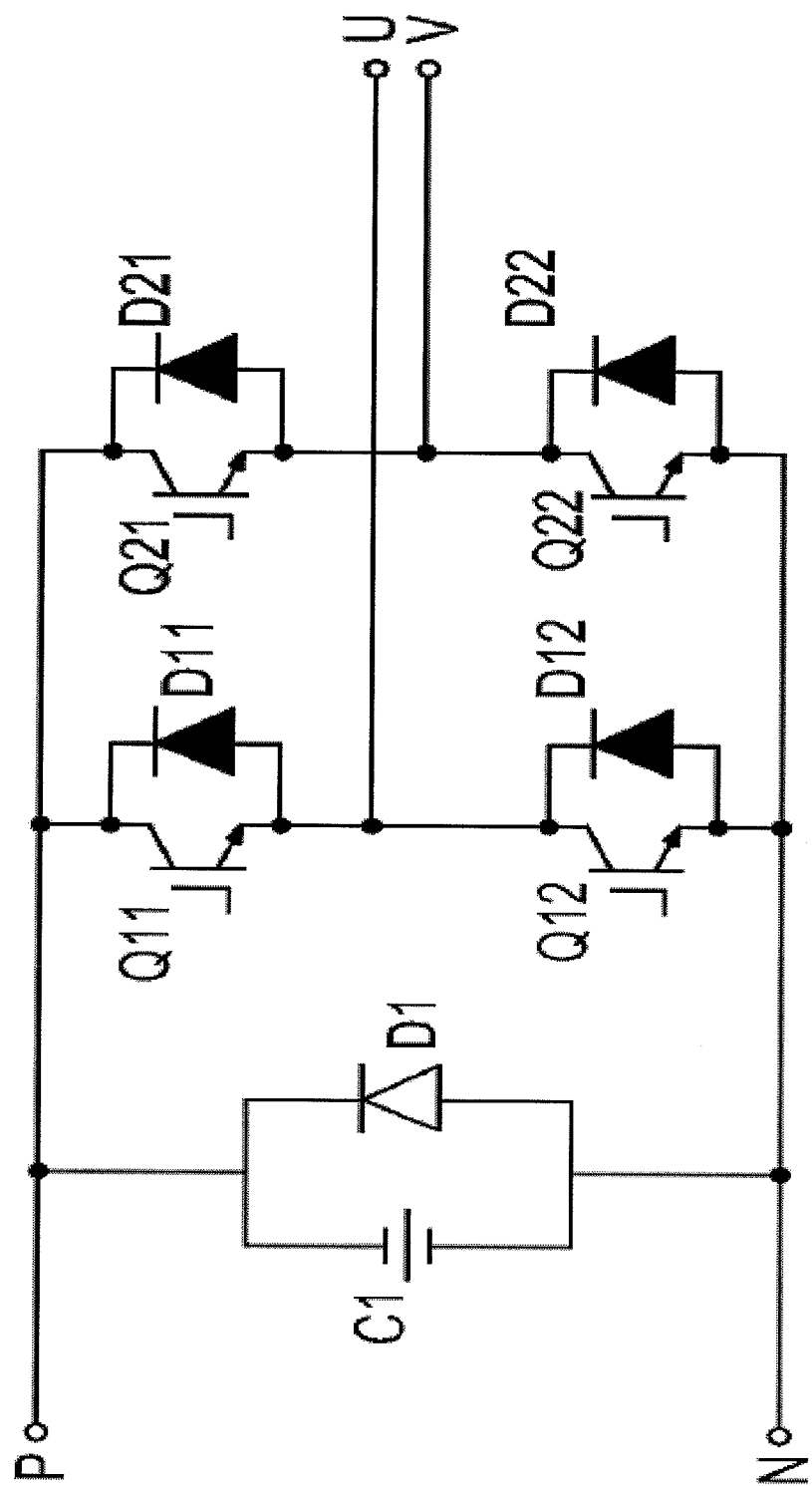
FIG. 7 is a circuit diagram showing a power conversion device of a seventh embodiment.

The seventh embodiment is characterized in that, as shown in FIG. 7, the PiN diode D1 is directly connected to the both terminals of the capacitor C1 in the power conversion device formed of a two-level, single-phase circuit. Other circuit components remain the same as those of the fourth embodiment shown in FIG. 4.

In the power conversion device of the present embodiment, identical to the fourth embodiment, if the circuit is shorted between the positive electrode P and the negative electrode N and thus a reverse current flows, it is possible to shunt the reverse current to the PiN diode D1 as well as the freewheel diodes D11 through D22, eventually reducing the current flowing through the SBD and JBS diodes of the freewheel diodes D11 through D22. This makes it possible to suppress destruction of the SBD or JBS freewheel diodes and to suppress the occurrence and expansion of destruction of the IGBT module.

Just like the present embodiment, it may be possible for the two-level, three-phase power conversion device of the first embodiment shown in FIG. 1 to employ the configuration in which the PiN diode D1 is directly connected to the terminals of the capacitor C1.

Further, for each of the third and sixth embodiments it is also possible to employ the configuration in which the PiN diode D2U is directly connected to the both terminals of the capacitor C2U and the PiN diode D2D is directly connected to the both terminals of the capacitor C2D.

Eighth Embodiment

Figure 8:
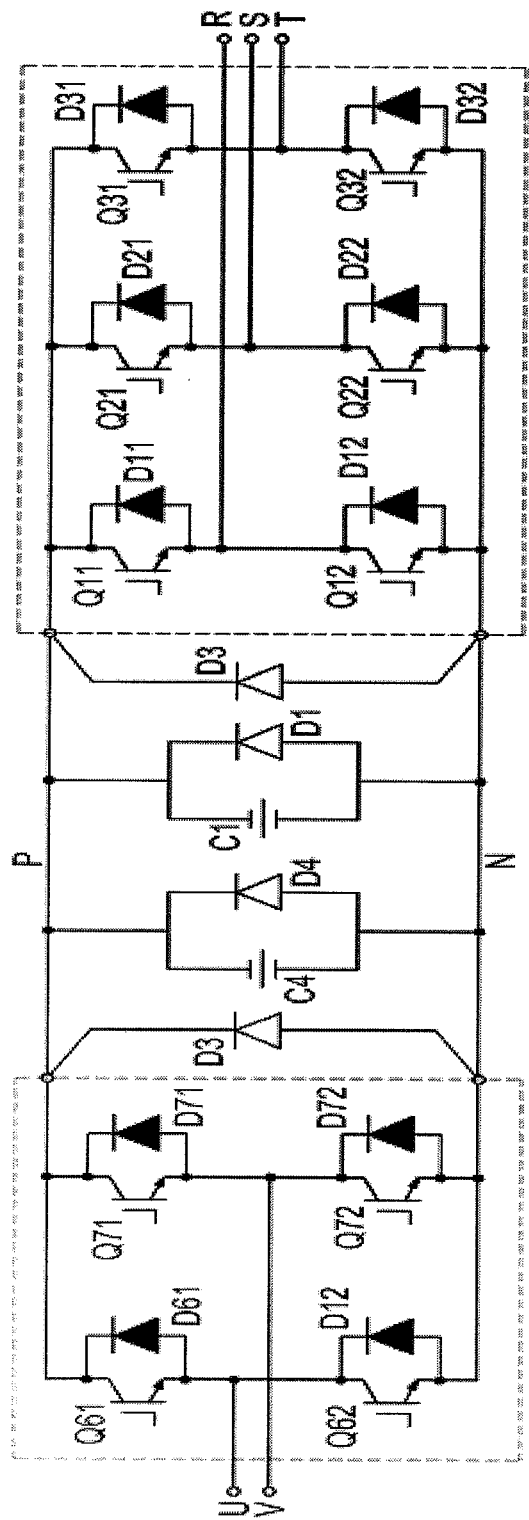
FIG. 8 is a circuit diagram showing a power conversion device of an eighth embodiment.

FIG. 8 shows a circuit of a power conversion device of an eighth embodiment. The power conversion device of the present embodiment is of the configuration in which a converter circuit for converting a single-phase alternating current to a direct current and an inverter circuit for converting a direct current to a three-phase alternating current are connected to each other with capacitors C4 and C1 arranged therebetween.

In the converter circuit, the upper and lower arms consist of semiconductor switching elements Q61 through Q72 such as IGBT elements, and SBD or JBS freewheel diodes D61 through D72 made of SiC with a pair of arms connected in anti-parallel to the respective semiconductor switching elements Q61 through Q72. A capacitor C4 is connected between a positive electrode P and a negative electrode N at the DC side, and at the same time a PiN diode D5 is connected with a pair of arms connected in anti-parallel between the positive electrode P and the negative electrode N at the AC side of the capacitor C4. In the present embodiment, a PiN diode D4 is also directly connected to both terminals of the capacitor C4.

In the inverter circuit, identical to the first embodiment shown in FIG. 1, the upper and lower arms of bridges for respective U, V and W-phases consist of semiconductor switching elements Q11 through Q32 such as IGBT elements, and SBD or JBS freewheel diodes D11 through D32 made of SiC with a pair of arms connected in anti-parallel to the respective semiconductor switching elements Q11 through Q32. A capacitor C1 is connected between a positive electrode P and a negative electrode N at the DC side of the inverter circuit, and at the same time a PiN diode D3 is connected with a pair of arms connected in anti-parallel between the positive electrode P and the negative electrode N at the AC side of the capacitor C1. In the present embodiment, a PiN diode D1 is also directly connected to the both terminals of the capacitor C1.

Somewhere in the power conversion device formed of the converter circuit and the inverter circuit, if the circuit is shorted between the positive electrode P and the negative electrode N and thus a reverse current flows, it is possible to shunt the reverse current to the PiN diode as well as the freewheel diodes, eventually reducing the current flowing through the SBD and JBS diodes of the freewheel diodes. This makes it possible to suppress destruction of the SBD or JBS freewheel diodes and to suppress the occurrence and expansion of destruction of the IGBT module.

As compared with the power conversion device employing the PiN diodes as the freewheel diodes, the power conversion devices of the foregoing respective embodiments using the SBD and JBS diodes as the freewheel diodes are capable of enhancing the device efficiency through loss reduction and reducing the device size, while suppressing the reliability decrease due to an element failure.

While certain embodiments have been described, these embodiments have been presented by way of example only, and are not intended to limit the scope of the inventions. Indeed, the novel power conversion devices described herein may be embodied in a variety of other forms; furthermore, various omissions, substitutions and changes in the form of the power conversion devices described herein may be made without departing from the sprit of the inventions. The accompanying claims and their equivalents are intended to cover such forms or modifications as would fall within the scope and sprit of the inventions.

What is claimed is:

1. A power conversion device, comprising:
   a positive electrode and a negative electrode placed at a DC side in the power conversion device;
   at least one capacitor connected between the positive electrode and the negative electrode;
   groups of semiconductor switching elements, wherein each group corresponds to one of a plurality of phases of the power conversion device and includes at least one semiconductor switching element contained in an upper arm and at least one semiconductor switching element contained in a lower arm;
   first diodes, wherein each of the first diodes is connected in anti-parallel to one of the semiconductor switching elements; and
   a second diode connected, in anti-parallel to each of the groups of semiconductor switching elements, to the positive electrode and the negative electrode, so that the second diode flows part of a reverse current when one of the groups of semiconductor switching elements shorts, wherein the second diode is better tolerated in electric current than the first diode.

2. The power conversion device according to claim 1, wherein the first diode is formed of an SBD or a JBS diode, and the second diode is formed of a PiN diode.

3. The power conversion device according to claim 1, wherein the second diode is placed between the capacitor and the groups of semiconductor switching elements.

4. The power conversion device according to claim 1, wherein the power conversion device is a three-phase alternating current conversion device, and the groups of semiconductor switching elements are composed of three groups and each group corresponds to one of three phases of the three-phase alternating current conversion device.

5. A power conversion device, comprising:
a positive electrode and a negative electrode placed at a DC side in the power conversion device;
at least one capacitor connected between the positive electrode and the negative electrode;
plural groups of semiconductor switching elements, wherein each group corresponds to one of a plurality of phases of the power conversion device and includes at least one semiconductor switching element contained in an upper arm and at least one semiconductor switching element contained in a lower arm;
first diodes, wherein each of the first diodes is connected in anti-parallel to one of the semiconductor switching elements; and
a second diode connected, in anti-parallel to each of the plural groups of semiconductor switching elements, to the positive electrode and the negative electrode, so that the second diode flows part of a reverse current when one of the groups of semiconductor switching elements shorts, wherein the second diode is better tolerated in electric current than the first diode.

6. The power conversion device according to claim 5, wherein the first diode is formed of an SBD or a JBS diode, and the second diode is formed of a PiN diode.

7. The power conversion device according to claim 5, wherein the second diode is placed between the capacitor and the plural groups of semiconductor switching elements.

8. The power conversion device according to claim 5, wherein the power conversion device is a three-phase alternating current conversion device, and the plural groups of semiconductor switching elements are composed of three groups and each group corresponds to one of three phases of the three-phase alternating current conversion device.

9. A power conversion device, comprising:
a positive electrode and a negative electrode placed at a DC side in the power conversion device;
a center point placed between the positive electrode and the negative electrode;
a first capacitor connected between the positive electrode and the center point;
a second capacitor connected between the center point and the negative electrode;
plural groups of semiconductor switching elements, wherein each group corresponds to one of a plurality of phases of the power conversion device and includes at least one semiconductor switching element contained in an upper arm, connected between the positive electrode and the center point, and at least one semiconductor switching elements contained in a lower arm, connected between the center point and the negative electrode;
first diodes, wherein each of the first diodes is connected in anti-parallel to one of the semiconductor switching elements; and
a second diode connected, in anti-parallel to the upper arm, to the positive electrode and the center point and a third diode connected, in anti parallel to the lower arm, to the center point and the negative electrode, so that the second diode and the third diode flow part of a reverse current when one of the groups of the semiconductor switching elements shorts, wherein the second diode and the third diode are better tolerated in electric current than the first diode.

10. The power conversion device according to claim 9, wherein the first diode is formed of an SBD or a JBS diode, and the second diode and the third diode are formed of a PiN diode.

11. The power conversion device according to claim 9, wherein the second diode is placed between the first capacitor and the upper arm and the third diode is placed between the second capacitor and the lower arm.

12. The power conversion device according to claim 9, wherein the power conversion device is a three-phase alternating current conversion device, and the plural groups of semiconductor switching elements are composed of three groups and each group is corresponding to one of three phases of the three-phase alternating current conversion device.

* * * * *